(12) United States Patent
Ruff et al.

(10) Patent No.: US 11,489,835 B2
(45) Date of Patent: Nov. 1, 2022

(54) ACCESS CONTROLLER FOR SECURE TRANSACTIONS

(71) Applicant: ASA Technologies, Corporation, Provo, UT (US)

(72) Inventors: Ryan Lawrence Ruff, Stanton, NE (US); Jay Landon Glenn, Provo, UT (US)

(73) Assignee: Asa Technologies, Corporation, Provo, UT (US)

( * ) Notice: Subject to any disclaimer, the term of this patent is extended or adjusted under 35 U.S.C. 154(b) by 288 days.

(21) Appl. No.: 16/798,011

(22) Filed: Feb. 21, 2020

(65) Prior Publication Data

US 2021/0266321 A1    Aug. 26, 2021

(51) Int. Cl.
| | |
|---|---|
| H04L 29/06 | (2006.01) |
| H04L 9/40 | (2022.01) |
| G06F 21/62 | (2013.01) |
| G08B 5/22 | (2006.01) |
| G06K 19/06 | (2006.01) |
| H04W 12/30 | (2021.01) |

(52) U.S. Cl.
CPC .......... H04L 63/10 (2013.01); G06F 21/6245 (2013.01); G06K 19/06037 (2013.01); G08B 5/22 (2013.01); H04L 63/0884 (2013.01); H04W 12/35 (2021.01)

(58) Field of Classification Search
CPC . H04L 63/10; H04L 63/0884; G06F 21/6245; G06F 21/64; G06K 19/06037; G08B 5/22; H04W 12/35; H04W 12/77; H04W 12/06; H04W 12/084; H04W 12/37
USPC .......................................................... 726/4
See application file for complete search history.

(56) References Cited

U.S. PATENT DOCUMENTS

| | | | |
|---|---|---|---|
| 2020/0042685 A1* | 2/2020 | Tussy ..................... | G06V 10/17 |
| 2021/0075791 A1* | 3/2021 | Dunjic ................. | H04W 12/06 |
| 2021/0400037 A1* | 12/2021 | Montgomerie ....... | H04W 12/06 |

* cited by examiner

*Primary Examiner* — Jeffrey C Pwu
*Assistant Examiner* — Nega Woldemariam
(74) *Attorney, Agent, or Firm* — Sterne, Kessler, Goldstein & Fox P.L.L.C.

(57) ABSTRACT

A method for performing secure transactions is disclosed. The method includes: providing an access controller between a core application and a third-party application, where the access controller prevents the third-party application from unauthorized access to the core application; receiving, by the access controller, a command from the third-party application to access the core application; transmitting, by the access controller, an authorization request to a secure application storing credentials of a user; providing, by the access controller, the third-party application with access to the core application in response to the access controller receiving notification from the secure application that the command is authorized; and preventing, by the access controller, the third-party application from accessing the core application in response to the access controller receiving notification from the secure application that the command is unauthorized.

16 Claims, 9 Drawing Sheets

ACCESS CONTROLLER FOR SECURE TRANSACTIONS

BACKGROUND TECHNOLOGY

Mobile applications are becoming increasingly popular. However, these mobile applications are not without security risks and access rights problems. Mobile applications that manage or have access to sensitive personal information (e.g., health information, financial information, etc.) are of great concern due to the possibility of unauthorized access to the sensitive data, unauthorized execution of commands, fraud, and theft.

For example, many mobile applications require a username and password to access the user's account and then store these credentials in a third-party's repository. If the repository is hacked or breached the user's credentials may be compromised and an unauthorized individual may attempt to gain access to the user's sensitive data. For example, in September 2017, the consumer credit reporting agency Equifax announced a data breach that exposed the personal information of 147 million people. Such major data breaches are becoming increasingly common and securing sensitive data in a networked-computing environment is a wide-spread technical concern in the industry.

Despite their risks and technical problems, the popularity of mobile applications continues to increase across all industries. For example, mobile banking has become popular. A mobile banking application may allow a user to conduct, on a mobile device, transactions that were traditionally conducted at a branch of the financial institution, such as opening/closing accounts, viewing, accessing, and transferring funds, depositing checks, etc. Often these mobile banking applications allow transactions at only a single financial institution. For example, Acme Bank may provide the Acme Bank mobile application that allows for transactions at its bank but third-party mobile applications are not permitted access to Acme Bank customer accounts or to conduct transactions. Limiting access to accounts through a single application allows banks and other financial institutions to manage security of customer's sensitive data but prevents customers from using third-party applications that the customers may prefer. However, in conventional systems, allowing third-party applications access to customer accounts would compound the security concerns and technical problems discussed above.

BRIEF SUMMARY

One or more embodiments relate to a method for performing secure transactions. The method comprises: providing an access controller between a core application and a third-party application, wherein the access controller prevents the third-party application from unauthorized access to the core application; receiving, by the access controller, a command from the third-party application to access the core application; transmitting, by the access controller, an authorization request to a secure application storing credentials of a user; providing, by the access controller, the third-party application with access to the core application in response to the access controller receiving notification from the secure application that the command is authorized; and preventing, by the access controller, the third-party application from accessing the core application in response to the access controller receiving notification from the secure application that the command is unauthorized.

One or more embodiments relate to a system for performing secure transactions. The system comprises: a computer processor; and a memory storing an access controller that, when executed by the computer processor, performs a plurality of operations that prevent unauthorized access to a core application. The plurality of operations comprise: receiving a command from a third-party application to access the core application; transmitting an authorization request to a secure application storing credentials of a user; providing the third-party application with access to the core application in response to the access controller receiving notification from the secure application that the command is authorized; and preventing the third-party application from accessing the core application in response to the access controller receiving notification from the secure application that the command is unauthorized.

One or more embodiments relate to a non-transitory computer readable (CRM) storing instructions for performing secure transactions using an access controller. The instructions, when executed by a computer processor, cause the access controller to perform a plurality of operations that prevent unauthorized access to a core application. The plurality of operations comprise: receiving a command from a third-party application to access the core application; transmitting an authorization request to a secure application storing credentials of a user; providing the third-party application with access to the core application in response to the access controller receiving notification from the secure application that the command is authorized; and preventing the third-party application from accessing the core application in response to the access controller receiving notification from the secure application that the command is unauthorized.

BRIEF DESCRIPTION OF THE DRAWINGS/FIGURES

DETAILED DESCRIPTION

Figure 1:
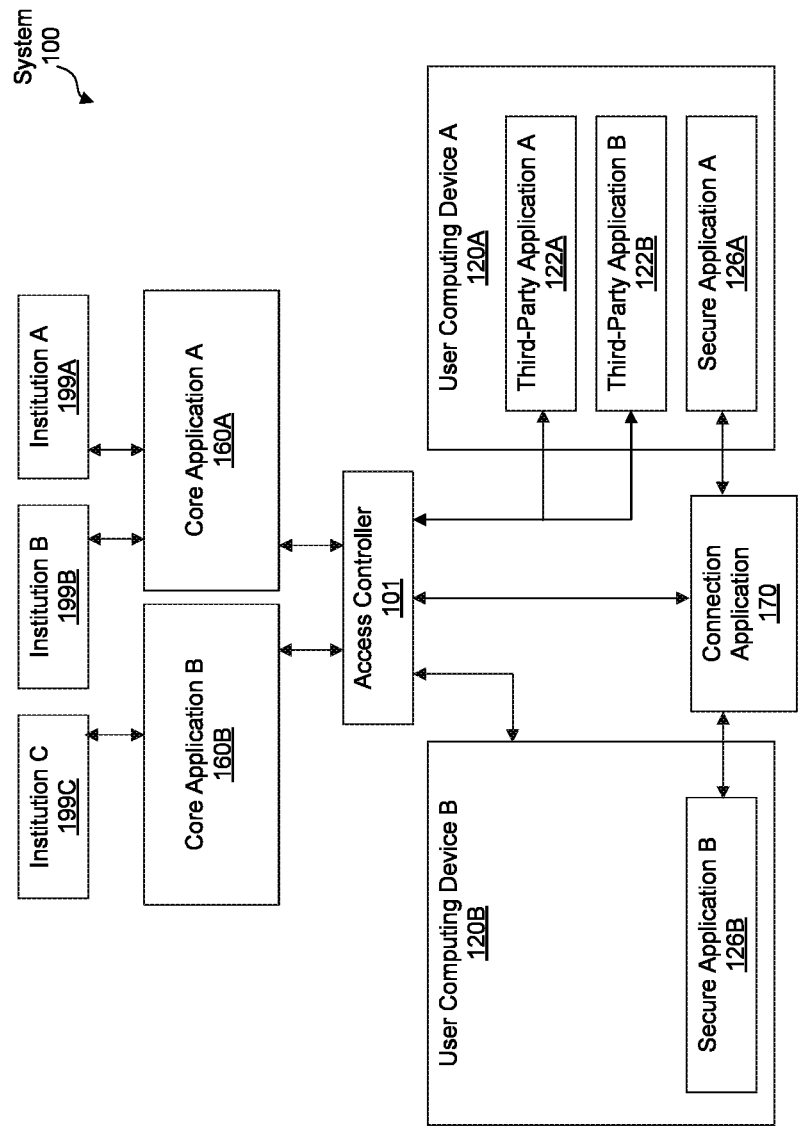
FIG. 1 shows a block diagram of a system in accordance with one or more embodiments.

Provided herein are system, method, and computer program product embodiments that allow for an increase in third-party integration into a computing environment without compromising data and network security. As discussed throughout this disclosure, the disclosed embodiments enhance data and network security over existing systems.

Disclosed embodiments include an access controller that interacts with and interfaces between core applications, secure applications, and end-user applications. Core applications include proprietary systems or applications, such as an institution's core processing software used to manage user accounts. For example, a core application can be a financial institution's core processing software that is used to manage funds on deposit or other accounts at the financial institution. Secure applications include digital wallet applications, which can maintain information such as personal data and verifiable credentials. Secure applications can reside on an end-user's computing device, such as a mobile computing device. End-user applications include client applications that reside on or are executed from the end-user's computing device. End-user applications may be applications provided by the same institution that provides a core application or by a third party (i.e., not the same institution that proves a core application). End-user applications include third-party financial technology applications ("FinTech Apps").

The access controller interacts with the secure application to allow for secure transactions between core applications and end-user applications in a networked computing environment, such as accessing and/or downloading data, transferring funds between accounts, creating or closing accounts, verifying user identity, etc. The access controller effectively allows, for example, a user to manage the funds on deposit at the user's financial institution using one or more third-party applications available in the marketplace. At the same time, the access controller gives the financial institution assurance that the user's financial data is being handled securely and commands are being initiated by the user and not by someone attempting to commit fraud. Accordingly, one or more embodiments provide solutions to one or more of the technical problems of online fraud, online user verification, online user authorization, data security, access rights, etc. (discussed below).

In one or more embodiments, the framework of the access controller can be broken down into three pieces: one or more third-party application APIs published by the access controller and called by third-party applications, a module that calls one or more secure application APIs published by one or more secure applications, and another module that calls one or more core application APIs published by one or more core applications.

In one or more embodiments, a third-party application API connects third-party applications to the access controller in order to allow the applications to receive a user's financial data pertaining to the user's accounts at a financial institution. The financial data could include data such as, but not limited to, debit transactions, credit transactions, current balance, etc. The received financial data is then used to populate the third-party applications for the purpose of, but not limited to, viewing and managing funds and/or other assets, debts, or property held at a financial institution.

In one or more embodiments, the third-party application API also enables the user to operate third-party applications (or other end-user applications) to send commands to the access controller. The commands may be related to, but are not limited to, bill pay, money transfers, open/close accounts, lock/unlock accounts, view information (e.g., account number, account holder name, account holder birthday), etc.

In one or more embodiments, a secure application API is utilized to access a connection application that enables a connection to a secure application storing signed user credentials. The secure application may execute on the user's computing device, such as a mobile computing device or a mobile phone. The secure application API is called by the access controller to perform tasks such as, but not limited to, verifying the identity of the user, authenticating that the user is intending to grant, expand, limit or revoke a third party's access to the user's data (e.g., user's financial transaction history), authorize commands, and/or other functions of the secure application. A secure application may be a digital wallet, such as a Self Sovereign Identity (SSI) Digital Wallet.

In one or more embodiments, the core application API is called by the access controller to obtain a user's data that is managed by the core application. This data may be relayed by the access controller to the user's chosen application. The core application API is also called by the access controller to execute one or more commands. These commands may be first sent by the user to the access controller from various third-party applications and then validated through the secure application.

Although the examples disclosed above describe financial institutions, financial data, and financial third-party applications, in other embodiments, the disclosed technology is not so limited. For example, the access controller may be utilized for data and third-party applications associated with academic institutions, corporations, government departments, charities, etc.

FIG. 1 shows a system 100 in accordance with one or more embodiments. As shown in FIG. 1, the system 100 includes an access controller 101; one or more end-user applications, such as third-party application A 122A, third-party application B 122B; one or more connection applications (e.g., connection application 170); one or more secure applications (e.g., secure application A 126A, secure application B 126B); and one or more core applications (e.g., core application A 160A, core application B 160B). These components (101, 122, 126, 160, 170) may be implemented in hardware, software, or a combination of hardware and software. Below, the system 100 of FIG. 1 is generally described as a financial computing environment including core financial applications and third-party, end-user FinTech applications. However, as discussed throughout this disclosure, the disclosed embodiments are not limited to use in a financial computing environment.

Each application illustrated in FIG. 1 may execute on one or more computing devices (e.g., a desktop personal computer (PC), a server, a mainframe, a kiosk, a mobile device (e.g., tablet PC, a laptop, a smartphone, etc.)) connected by a computer network. The computer network may include wired and/or wireless segments. Moreover, two or more of the components may execute on the same computing device. For example, third-party application A 122A, third-party application B 122B, and secure application A 126A all execute on user computing device A 120A.

In one or more embodiments, each core application 160 is associated with one or more institutions (e.g., institution A 199A, institution B 199B, and institution C 199C). These institutions 199 may correspond to financial institutions (e.g., banks, credit unions, brokerage firms, credit reporting agencies, etc.), healthcare institutions (e.g., hospitals, clinics, doctor office, labs, etc.), private employers, government departments, academic institutions, charities, etc. Core applications 160 may manage data (e.g., financial data, health data, student records, etc.) for the institutions and enable the data to be accessible (e.g., for download) to third-party applications 122 (discussed below). In these embodiments, each core application 160 may publish a core application API that provides access to the data and functionality of the core applications 160, and may receive commands issued by third-party applications 122 (also discussed below).

As an example, a core application associated with a financial institution may be involved in maintaining accurate accounting of funds on deposit in a checking, savings, CD or other types of accounts, authenticating a customer's identity, interfacing with credit card payment networks, interfacing with other financial institutions to facilitate payments and transferring of funds, opening or closing accounts, etc.

End-user applications, such as third-party applications 122, can issue commands for execution by the core applications 160. The commands may include requests to access (e.g., download) data managed by the core applications 160. The commands may also correspond to other operations to be performed by the core applications 160. In one or more embodiments, a third-party application 122 may need to verify the identity of a user before the user can create an account with the third-party application.

In one or more embodiments, the commands may include requests to download financial data associated with a user including one or more of account balance, account debits/credits, scheduled debits/credits, interest or investment returns, debt fees, payments, interest rate, etc. The commands may also include requests to transfer money, make a payment, make a deposit, create/delete an account, lock/unlock an account, view sensitive information (e.g., account number, account holder name, account holder birthday) using, for an example, a read-only iframe, secure pop up, or the like shown by the third-party application 122, the secure application 126, or the access controller 101, etc. Accordingly, the financial third-party application enables the user to view his or her financial data, manage his or her finances and financial accounts, pay merchants, etc.

In one or more embodiments, the third-party applications 122 are available online for download (e.g., from online stores). A user may purchase and download a third-party application 122 to his or her user computing device 120. Some third-party applications may be downloaded without charge. The third-party applications 122 may be created by any entity including the institutions 199 and entities independent of the institutions 199. Although not shown in FIG. 1, user computing device B 120B may also be executing one or more third-party applications 122.

In one or more embodiments, each of the secure applications 126 is a self-sovereign identity (SSI) digital wallet software application. Moreover, each secure application 126 is associated with a user. For example, secure application A 126A is associated with the user operating user computing device A 120A. Similarly, secure application B 126B is associated with the user operating user computing device B 120B. Each of the secure applications 126 manages user data including, for example, verifiable credentials (e.g., tokens or keys from an institution 199 or the core application 160 and given to a user), name, age, etc. Further, each of the secure applications 126 may be configured to securely perform tasks including, for example, user verification, granting, expanding, limiting or revoking third-party software application access to user data, authorizing commands issued by third-party software applications 122, signing credentials, etc. Further still, each of the secure applications 126 may also generate identifiers (e.g., strings, 2D barcodes, etc.) that identify the secure application (discussed below). A user may copy an identifier from the secure application 126 and paste it in another application (e.g., third-party application 122, discussed below). Additionally or alternatively, the secure application 126 may share or transmit the identifier to another application (e.g., third-party application 122).

In one or more embodiments, access controller 101 is a software application that prevents the third-party applications 122 from sending unauthorized commands to the core applications 160 and having unauthorized access to the data managed by the core applications 160. The access controller 101 may transmit an authorization request to the appropriate secure application 126 for each command issued by a third-party application 122 and relay the command to the appropriate core application 160 upon receiving authorization for the command.

In one or more embodiments, the institutions 199 provide core applications 160 that integrate with the access controller 101. The third-party applications 122 also integrate with the access controller 101. These integrations with the access controller 101 complete a secure pathway to allow for user data (e.g., financial data, health data, student records, etc.) to be sent from core applications 160 to the third party applications 122. Similarly, this secure pathway allows for commands to be sent from the third-party applications 122 to the core applications 160. In one or more embodiments, the access controller 101 is implemented as API endpoints that allow for the relaying of data and commands between the core applications 160, the secure applications 126, and the third-party applications 122.

In one or more embodiments, the connection application 170 facilitates the generation and maintenance of secure links between software applications (e.g., between access controller 101 and secure applications 126, between secure applications 126 to core applications 160 (not shown), between secure applications 126 to institutions 199 (not shown)) and facilitating the secure transmission of data between the connected applications. For example, the connection application 170 may relay authorization requests and notifications of authorization (discussed below) between the access controller 101 and the secure applications 126. In one or more embodiments, the connection application 170 also facilitates in generating verifiable credentials for a user or other public/private verifiable credentials. Additionally or alternatively, the connection application 170 may be connected to a separate agent configured to generate verifiable credentials for a user, generate other public and/or private verifiable credentials, store and sign verifiable credentials, etc. Although FIG. 1 shows the connection application 170 as being separate from the access controller 101, in one or more embodiments, the access controller 101 includes the functionality of connection application 170 and the separate connection application 170 may be omitted. In one or more embodiments, the connection software 170 is primarily utilized when creating a new secure link (e.g., first time set up, lost user computing device and need to set the secure link up again, etc.). In one or more embodiments, once the secure link is established the connection application 170 might not be required.

Figure 2:
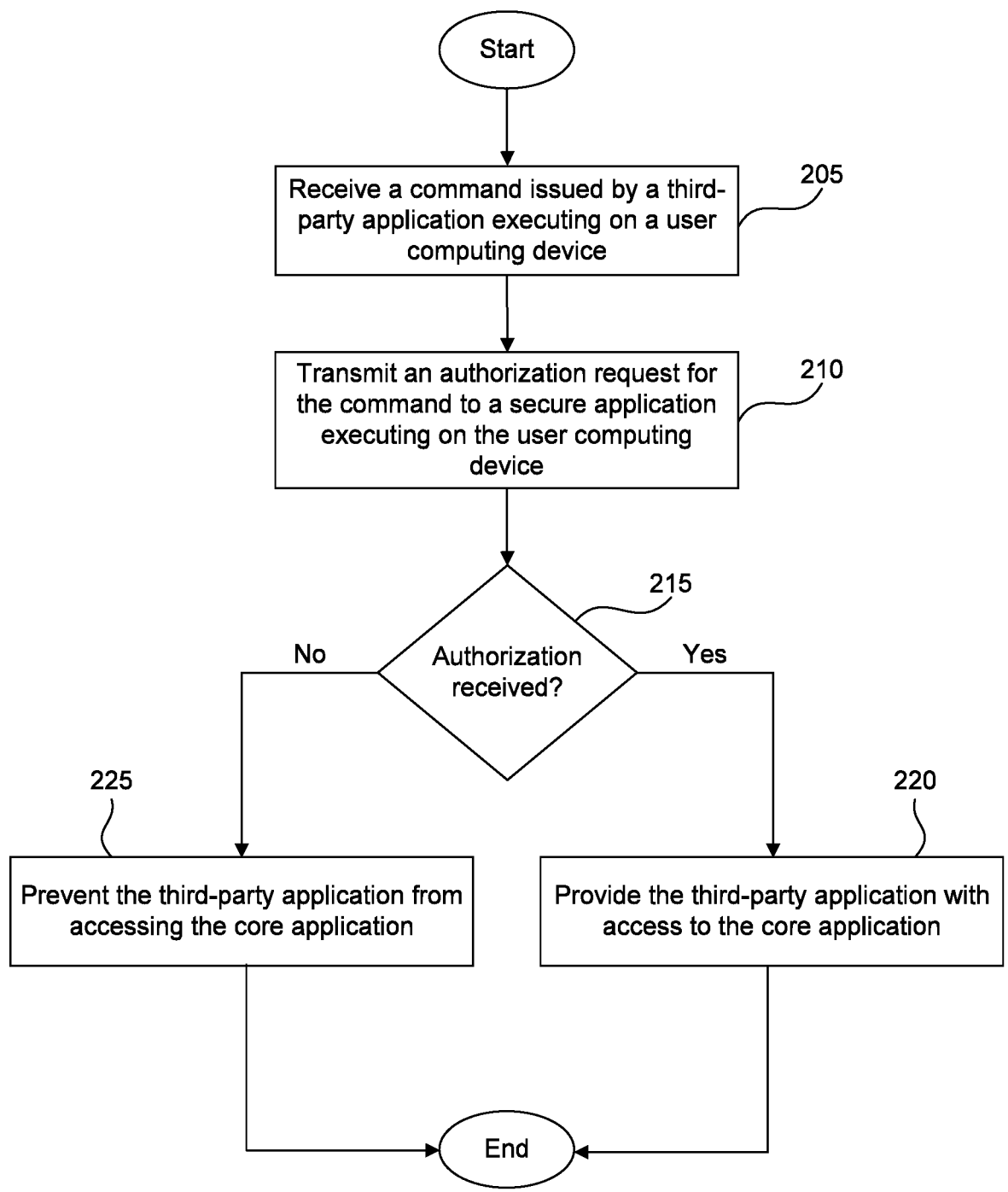
FIG. 2 shows a flowchart for preventing a third-party application from gaining unauthorized access to a core application in accordance with one or more embodiments.

FIG. 2 shows a flowchart in accordance with one or more embodiments. The flowchart of FIG. 2 depicts a process for performing secure transactions. Specifically, the process depicted in FIG. 2 uses an access controller to prevent a third-party application from gaining unauthorized access to a core application in accordance with one or more embodiments. One or more of the steps in FIG. 2 may be performed by access controller 101, discussed above in reference to FIG. 1. In one or more embodiments, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2. The steps shown in FIG. 2 may be implemented as computer-readable instructions stored on computer-readable media, where, when the instructions are executed, cause a processor to perform the process of FIG. 2

In step 205, a command is received by the access controller (e.g., via the third-party application API). The command may be issued by a third-party application operated by a user and executing on a user computing device (e.g., mobile device). The command may be intended for and specify a core application associated with an institution. The command may include a request to download, to the third-party application, data managed by the core application and/or a request for the core application (or associated institution) to perform another operation. In one or more embodiments, the requested data is utilized by the third-party application to verify the identity of the user.

In one or more embodiments, the command includes an identifier. Alternatively, the identifier may be separate from the command but included in the same message as the command. The identifier may have been generated by and identifies a secure application executing on the same user computing device (or a different user computing device) as the third-party application. The identifier may correspond to a numerical value, a string, a 2D bar code, etc. A user may have copied the identifier generated by the secure application and pasted the identifier into the third-party application for transmission with the command. Alternatively, the third-party application may have obtained the identifier directly from the secure application for transmission with the command.

In step 210, an authorization request for the command is transmitted by the access controller to the secure application based on the identifier (e.g., via a secure application API). The authorization request for the command may be transmitted over a secure connection established and maintained by the connection application. The connection application may relay the authorization request from the access controller to the secure application. The authorization request may include the command itself. Alternatively, the authorization request does not include the command but does include information regarding the command (e.g., the type of command, the third-party application that issued the command, etc.).

In one or more embodiments, in response to receiving the authorization request, the secure application generates an alert (e.g., a message displayed on a graphical user interface ("GUI")) on the user computing device prompting the user to authorize or block (e.g., decline) the command. The alert may identify the command, the third-party application that issued the command, and/or the targeted core application or associated institution or account (e.g., last four digits of account number) for the command. The user's decision (e.g., authorize, block, etc.) may be transmitted in a notification back to the access controller using the secure connection. In one or more embodiments, the notification is a binary answer to the authorization request. Additionally or alternatively, when the command includes a request to download data from a core application, the notification may restrict or enlarge the scope of data permitted to be downloaded. If there are multiple accounts managed by the core application, the notification may permit the download of user data from all of the accounts or just a selected subset of the accounts. This scope modification may be an option presented in the alert to the user.

In one or more embodiments, the notification may indicate that all future commands of the same type (e.g., requests to download transaction history and other read-only type commands) and/or issued by the same third-party application (e.g., an already authorized third-party application) are to be authorized (or blocked) without contacting the secure application, effectively bypassing the need to generate authorization requests.

In one or more embodiments, when the command involves transferring a high value or jointly-owned/managed asset, authorization requests may be sent to one or more additional individual including, for example, the co-owner(s) (e.g., user's spouse) of the asset, the user's attorney, a co-trustee of a trust owning the asset, etc.

In step 215, it is determined whether the user has authorized the command. As discussed above, this is indicated in the notification from the secure application. When it is determined that the user (and potentially other individuals (e.g., asset co-owners)) has authorized the command, the process proceeds to step 220. When it is determined that the command is unauthorized (e.g., the user has blocked the command), the process proceeds to step 225. If a notification is not received from the secure application (e.g., the secure application is offline, the secure connection between the secure application and the access controller is severed, etc.), the command may be deemed unauthorized as a default. The access controller may send a notice back to the third-party application indicating that authorization was not received from the secure application. The access controller may also send back notifications to the third-party application indicating that the connection to the secure application has failed (and thus the command cannot be authorized) and/or the secure application is offline (and thus the command cannot be authorized).

Figure 3:
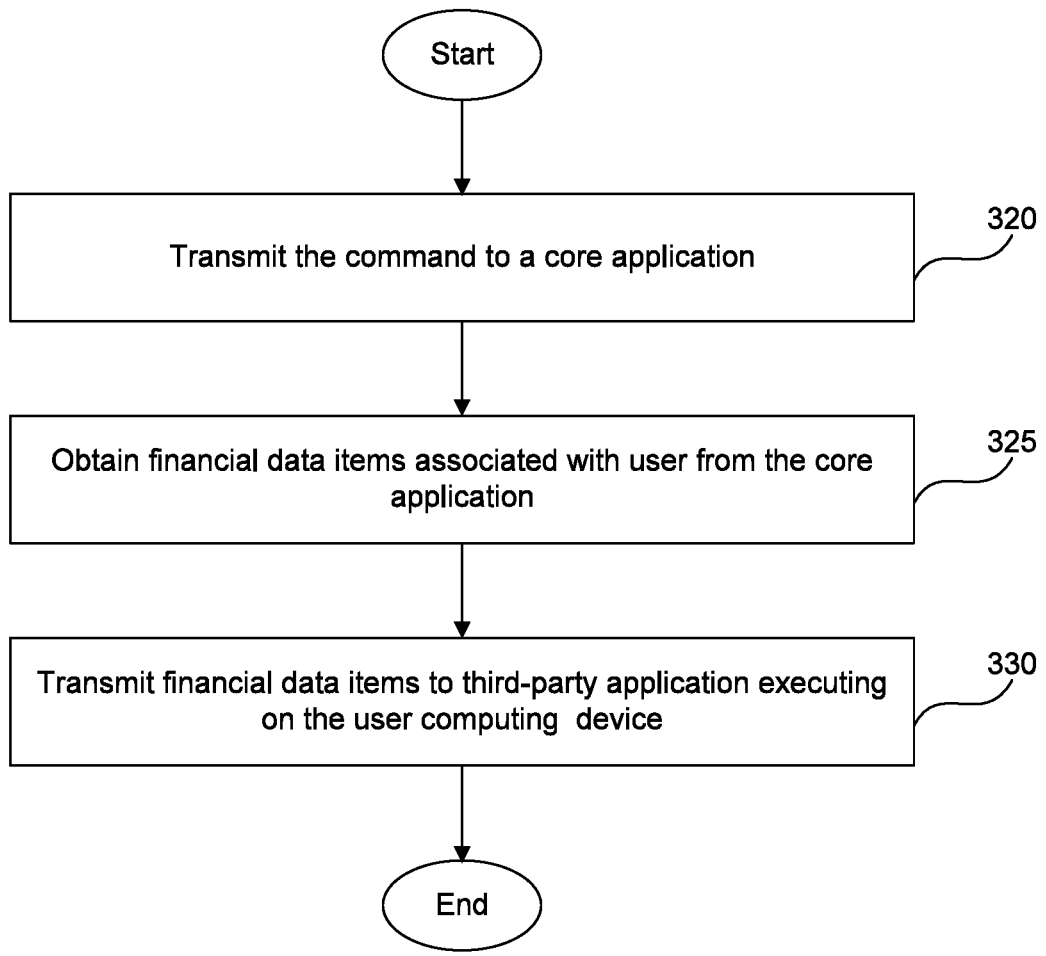
FIG. 3 shows a flowchart for downloading user data from a core application to an authorized third-party application using an access controller in accordance with one or more embodiments.

In step 220, the access controller provides the third-party application with access to the specified core application in response to the notification. This may include transmitting (e.g., via the core application API) the command issued by the third-party application to the specified core application for execution by the core application. For example, if the core application is associated with a financial institution, the commands may include a request to transfer money, make a payment, make a deposit, create/delete an account, lock/unlock an account, etc. FIG. 3 provides additional details regarding step 220.

In one or more embodiments, the notification mentioned in step 215 and step 220 is a one-time use notification. In other words, the notification can only be used once by the access controller to transmit a command to the core application. Accordingly, the one-time use notification prevents the access controller from using the same notification to re-transmit the same command to a core application and/or to transmit a different command to a core application. The one-time use notification framework may be implemented using one or more techniques.

For example, the one-time use notification may be implemented using timestamps. Specifically, the notification may include a timestamp and the access controller may be configured to forward the command to the specified core application within a short window (e.g., a few seconds, minutes, etc.) following the timestamp. Otherwise, the notification expires and the access controller may be required to transmit a new authorization request for the command to the secure application.

Additionally or alternatively, the one-time use notification may be implemented using a counter value or another unique identifier. For example, the access controller may increment a counter every time a command is received from a third-party application. The authorization request for the command may include the counter value and the notification corresponding to the authorization request also includes the counter value (i.e., matching counter value). The access controller may be configured to transmit the command that triggered the authorization request only when the access controller has received the notification with the matching counter value. Moreover, the access controller may be configured to transmit the command only when the difference between the current counter value and the counter value associated with the command is less than a threshold.

Additionally or alternatively, the access controller may maintain a list of commands that were transmitted to core applications. Each received command may be compared with the list. If a match between the current command and the list is identified, the access controller may be configured to send a new authorization request to the secure application.

In step 225, the access controller prevents the third-party application from accessing the specified core application. This may include ignoring until it expires, expressly discarding the command, etc. This may also include sending a notice back to the third-party application indicating that the command was declined by the secure application.

FIG. 3 shows a flowchart in accordance with one or more embodiments. The flowchart of FIG. 3 depicts a process for performing secure transactions, such as secure transactions at a financial institution. Again, the disclosed embodiments are not limited to financial applications. Specifically, the process depicted in FIG. 3 downloads user data from a core application to an authorized third-party application using an access controller. One or more of the steps in FIG. 3 may be performed by access controller 101, discussed above in reference to FIG. 1. Moreover, the steps in FIG. 3 may correspond to one or more sub-steps of step 220, discussed above in reference to FIG. 2. In one or more embodiments, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3. The steps shown in FIG. 3 may be implemented as computer-readable instructions stored on computer-readable media, where, when the instructions are executed, cause a processor to perform the process of FIG. 3

In step 320, a command is transmitted (e.g., via a core application API) by the access controller to a core application. The command may specify the core application and the command is transmitted to the core application in response to a notification that the command is authorized. The command may have been issued by a third-party application executing on a user computing device operated by a user. The command may include a request to download user financial data items managed by the core application and/or financial institution associated with the core application to the third-party application.

In step 325, the requested data, e.g., user financial data, is received by the access controller from the core application in response to transmitting the request. The user financial data may include the user's account balance, account debits/credits, scheduled debits/credits, interest or investment returns, debt fees, payments, interest rate, etc.

In step 330, the access controller transmits the user financial data to the third-party application executing on the user computing device. The user is now able to view and manage his or her finances using the third-party application. Additionally or alternatively, the third-party application may utilize the financial data items to verify the identity of the user, confirm the user has sufficient funds for a future transaction, etc.

Figure 4:
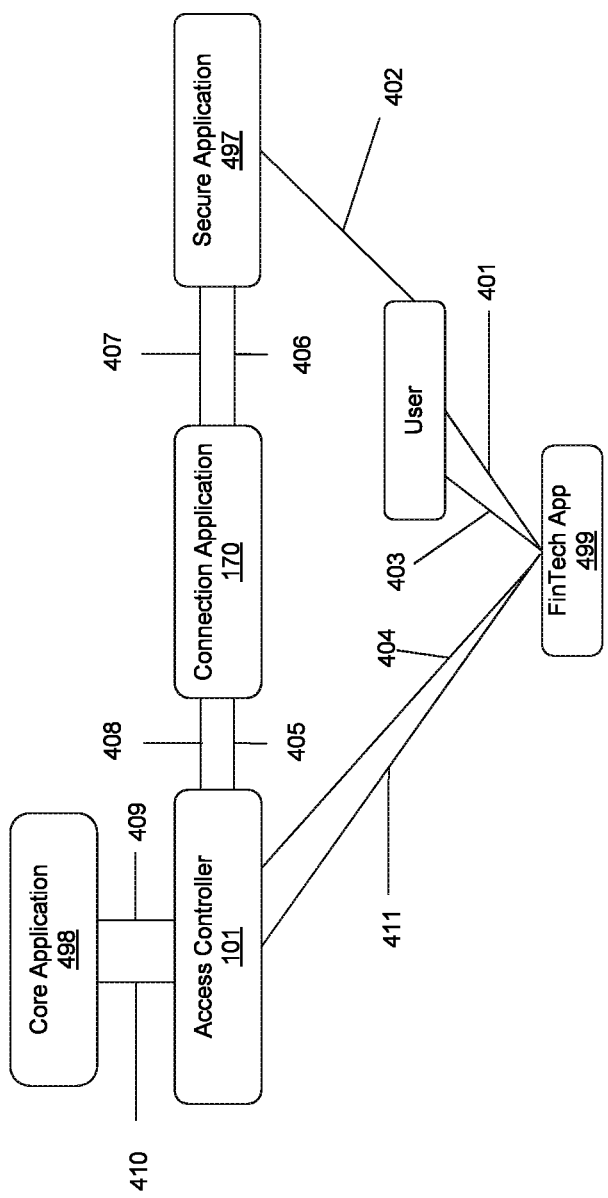
FIG. 4 shows an example of downloading user financial data from a core application to a third-party application using an access controller in accordance with one or more embodiments.

FIG. 4 shows an example utilizing one or more components of FIG. 1 in accordance with one or more embodiments. Specifically, FIG. 4 shows an example of downloading user financial data from a core application to a third-party application using an access controller. The following description includes reference numerals identifying components within FIG. 4, operations being performed by the components, and/or communication between components. FIG. 4 is related to the processes discussed above in reference to FIG. 2 and FIG. 3. The steps shown in FIG. 4 may be implemented as computer-readable instructions stored on computer-readable media, where, when the instructions are executed, cause a processor to perform the process of FIG. 4

At 401, a user selects a FinTech App 499 (e.g., a third-party application for online banking) and is directed to the app store associated with the user's smartphone in order to download the FinTech Application 499 that is compatible with the user's smartphone.

At 402, the user accesses secure application 497 and generates a QR code, or some other identifier, with all the information needed to create a connection between the FinTech Application 499 and the user's desired financial institution. The user may copy the QR code or write down the identifier. At 403, the user pastes the QR code, or other type of identifier, into the setup screen on the FinTech Application 499. Alternatively, the user could request that the secure application 497 share the identifier with the FinTech Application 499 directly.

At 404, the FinTech Application 499 sends the QR code, or other type of identifier, to the access controller 101. The FinTech Application 499 may send a command to download user financial data from the financial institution along with the identifier. 402, 403, and 404 may be considered sub-steps of Step 205, discussed above in reference to FIG. 2.

At 405, the access controller 101 reads the QR code, or other type of identifier. The access controller 101 may have access to a database or lookup table that links identifiers with secure applications and thus the access controller 101 identifies the appropriate secure application based on the identifier. The access controller 101 sends an authorization request for the command to the connection application 170 connected to the appropriate secure application 497 or capable of connecting to the appropriate secure application 497.

At 406, the connection application 170 relays the authorization request to secure application 497 asking the user to confirm that this new connection should be made (e.g., confirm the command should be executed). In one or more embodiments, one or more of the credentials held by the secure application 497 are validated before or after the connection application 170 relays the authorization request to the secure application 497.

At 407, after the user confirms the new connection, the secure application 497 sends a notification authorizing the command back to the connection application 170. Alternatively, there may be a direct connection between the access controller 101 and secure application 497 instead of routing the notification through the connection application 170.

At 408, the connection application 170 relays the notification back to the access controller 101.

At 409, the access controller 101 sends a connection request with the command to the core application 498 associated with the financial institution.

At 410, the core application 498 uses the existing API or creates a secure link between the core application 498 and the access controller 101 and then executes the command to download the user's financial data. This allows for the user's financial data to be sent from the core application 498 to the access controller 101.

At 411, the access controller 101 relays user's financial data (as received from core application 498) to the authorized FinTech Application 499.

Figure 5:
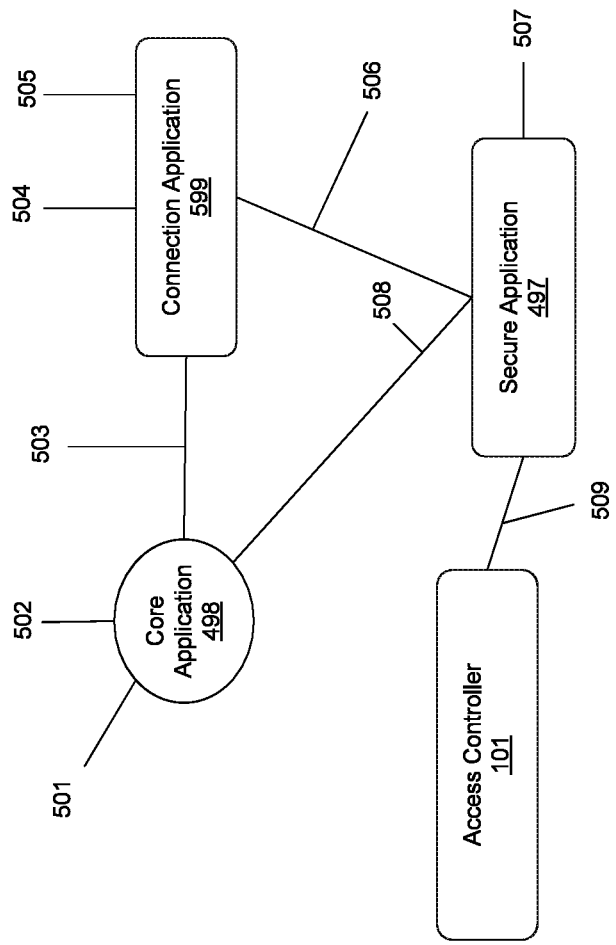
FIG. 5 shows an example of populating a secure application with credentials for a new user in accordance with one or more embodiments.

FIG. 5 shows an example utilizing one or more components of FIG. 1 in accordance with one or more embodiments. Specifically, FIG. 5 shows an example of populating a secure application with credentials for a new user. The following description includes reference numerals identifying components within FIG. 5, operations being performed by the components, and/or communication between components. The example in FIG. 5 is related to generation and use of credentials. The steps shown in FIG. 5 may be implemented as computer-readable instructions stored on computer-readable media, where, when the instructions are executed, cause a processor to perform the process of FIG. 5

At 501, the financial institution invokes its existing know-your-customer (KYC) process to verify the identity of the user. At 502, the financial institution creates the parameters for creating verifiable credentials for the user and documents what information has been verified regarding the user including, for example: name, address, accounts, age, etc.

At 503, the financial institution or core application 498 associated with the financial institution sends the user parameters to the connection application 599 or another agent.

At 504, the connection application 599 or another agent creates the verifiable credentials. In one or more embodiments, the connection application 599 includes a digital wallet.

At 505, the financial institution signs the verifiable credentials.

At 506, the signed credentials are sent from the connection application 599 to the secure application 497 executing on the user's computing device (e.g., smartphone).

At 507, the user accesses secure application 497 and signs the credentials.

At 508, a secure connection is created between core application 498 and secure application 497. Additionally or alternatively, the secure connection might pass through the connection application 599.

At 509, a secure connection is created between secure application 497 and the access controller 101. Additionally or alternatively, the secure connection might pass through the connection application 170 (not shown in FIG. 5).

Figure 6:
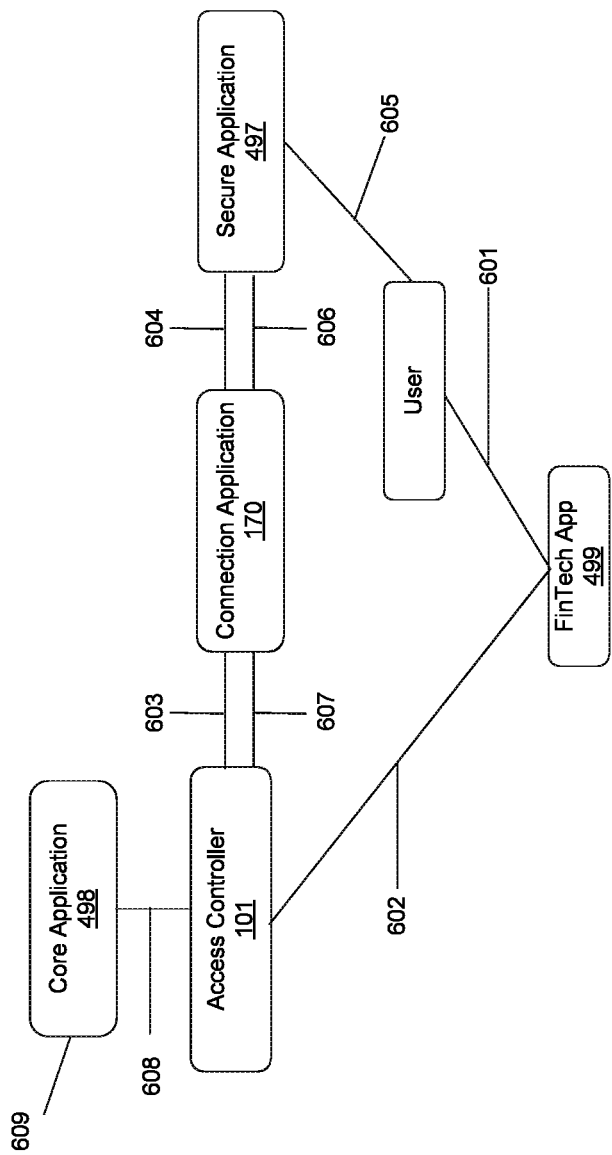
FIG. 6 shows an example of a third-party application sending, using an access controller, a command to a core application for execution in accordance with one or more embodiments.

FIG. 6 shows an example utilizing one or more components of FIG. 1 in accordance with one or more embodiments. Specifically, FIG. 6 shows an example of a third-party application sending, using the access controller, a command to a core application for execution. The following description includes reference numerals identifying components within FIG. 6, operations being performed by the components, and/or communication between components. Example 6 is related to the processes discussed above in reference to FIG. 2. The steps shown in FIG. 6 may be implemented as computer-readable instructions stored on computer-readable media, where, when the instructions are executed, cause a processor to perform the process of FIG. 6

At 601, the user accesses the FinTech Application 499 and provides details of a desired money transfer between a checking account and a savings account, such as, the amount and when to initiate the transfer.

At 602, the FinTech Application 499 sends the user's request to the access controller 101 in the form of a command.

At 603, the access controller 101 transmits the command to the connection application 170.

At 604, the connection application relays the commands to a secure application 497, which is executing on the same user computing device as the FinTech Application 499. Alternatively, the secure application 497 may be executing on a different user computing device than the FinTech Application 499.

At 605, the user authorizes the command through secure application 497.

At 606, secure application 497 sends a one-time use notification that the command is authorized to the connection application 170.

At 607, the connection application 170 relays the one-time notification to the access controller 101. Alternatively, there may be a direct connection between the access controller 101 and secure application 497 instead of routing through the connection application 170.

At 608, the access controller 101 relays the command to core application 498 associated with the user's financial institution (not shown).

At 609, core application 498 executes the authorized command to move money from the user's checking account to the user's savings account. Although FIGS. 4-6 focus heavily on financial transactions the invention is not so limited and may be used to conduct other secure transactions, such as validating identity, e-commerce, or any other transaction. For example, instead of using a username and password to create an account with an application, the user could use their verifiable credentials within the secure application to create an account on the application. This has several technical advantages. First, the user would not be required to recall her username and password, which is a constant source of user frustration when attempting to access a user account over a computer network. In fact, the user could use any third-party application connected to the access controller without ever having to create a username and password. Instead, the user would use the secure application to approve connections, approve commands, etc. So the user would have one single place that is on a closed connection that allows the user to control access to all of his/her applications. Second, using verifiable credentials will reduce network-based fraud because a verified account would mean that it is a real person with a real bank account with funds to complete transactions. As another example, if the user desired to buy a product from a shopping marketplace or peer-to-peer shopping website, the user would be able to provide proof of funds or pre-approval from their financial institution. Those funds could be held in escrow until a satisfactory completion of the transaction where both parties (i.e., seller and buyer) are satisfied and complete the transaction via the secure application asking the user to confirm that the transaction is complete. Additionally or alternatively, the transaction might be completed via the third-party application and then the transaction is verified/confirmed by the user in the secure application. Transactions involving small dollar amounts (e.g., dollar amounts less than a threshold) may be completed entirely by the third-party application without the need for the user to verify/confirm the transaction in the secure application.

In one or more embodiments, the user could also provide credentials from the secure application that could be validated on the ledger with the issuing financial institution. This would allow the user to confirm that they are in fact a customer of the financial institution and they do have an account and also any other information they choose to share. The validation of the credentials may be performed by the access controller, a core application, a third-party application, etc.

Figure 7:
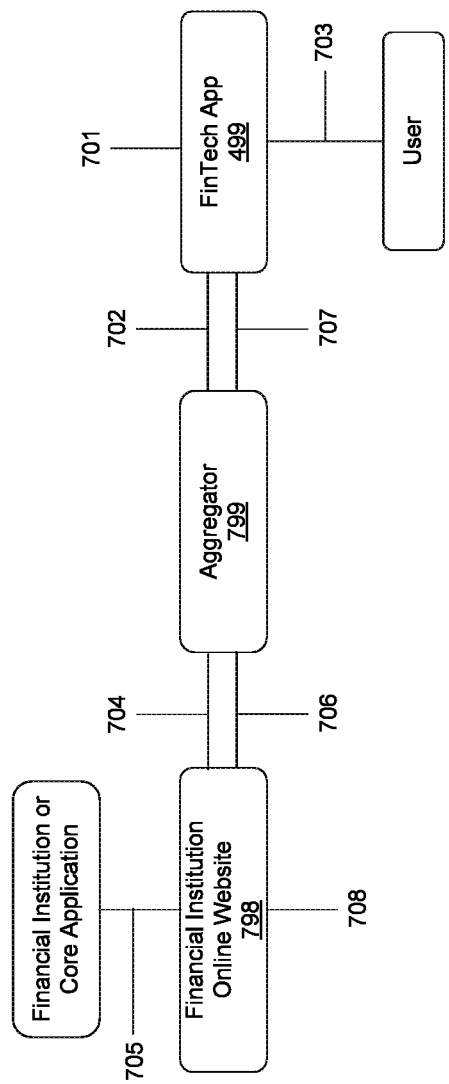
FIG. 7 and FIG. 8 show examples of conventional systems in accordance with one or more embodiments.

FIG. 7 is an example of a conventional system involving an aggregator that suffers from a variety of technical problems and shortcomings, including exposure to network-based fraud, data breaches, and/or the inability of a FinTech Application to access user data in a secure way. The embodiments disclosed and claimed herein provide technical solutions to the technical limitations of the conventional system illustrated in FIG. 7. The following description includes reference numerals identifying components within FIG. 7 and/or communication between components.

At 701, a user downloads a FinTech Application 499 that is compatible with the user's personal computing device.

At 702, the FinTech Application 499 opens an iframe, or window, to the aggregator 799. The aggregator 799 is software that logs into financial institutions using user login credentials and then screen scrapes account information and personal data from the user account to share with the FinTech Application 499. The aggregator 799 might also connect using an API instead of screen scraping. Accordingly, the aggregator 799 will request that the user select which financial institution to collect user financial data from. Once the financial institution is selected, the aggregator 799 will ask for login credentials for the financial institution (e.g., username and password or secret phrase).

At 703, the user inputs their login credentials to the FinTech App 499 which is effectively an iframe to the aggregator 799.

At 704, the aggregator 799 logs into the website of the financial institution 798 using the login credentials.

At 705, the user's financial information is provided via the website 798 for the user to manage their funds on deposit or other accounts.

At 706, the aggregator 799 has gained access to the website 798 as if the aggregator 799 was the user. Accordingly, the aggregator 799 now has full access to the user's account. The user's financial data is screen scraped or downloaded through an API and collected by the aggregator 799. In the event the aggregator 799 is compromised and fraud is committed, the financial institution is unlikely to reimburse the user for any lost funds because the user willingly surrendered login credentials to the aggregator 799.

At 707, the aggregator 799 provides the user's financial data to the FinTech App 499 so that the FinTech App may perform various financial functions including budgeting, saving, investing, etc.

At 708, the financial institution will often black list the IP address of the aggregator 799 to prevent the aggregator 799 from accessing the user's financial data. Moreover, if the financial institution makes any changes to the financial institution's website or login pages then it will render the aggregator's screen scraping program obsolete. In contrast, one or more of the embodiments corresponding to FIGS. 1-6 operate without an aggregator. Accordingly, in the embodiments corresponding to FIGS. 1-6, the user does not need to surrender his or her username and password to an aggregator and risk these credentials becoming compromised. Further, in the embodiments corresponding to FIGS. 1-6, the access controller 101, unlike the aggregator 799, can still access financial data even if the financial institution changes its website because the access controller 101 is integrated with the core application of the financial institution. Further still, in the embodiments corresponding to FIGS. 1-6, the access controller 101, acting in concert with the secure application 126, can restrict the access rights of any third-party application and thus unlike the aggregator 799, no third-party application has unchecked access to financial data.

Figure 8:
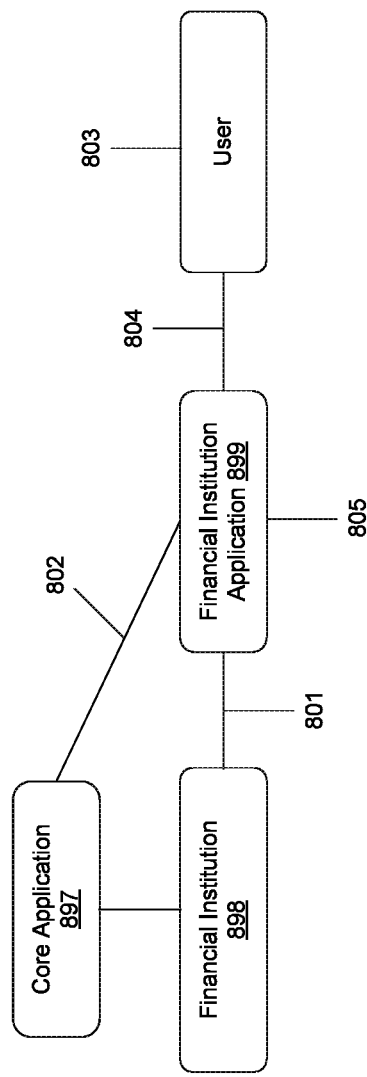

FIG. 8 is an example of a conventional system that is distinguishable from system 100, discussed above in reference to FIG. 1. The following description includes reference numerals identifying components within FIG. 8 and/or communication between components.

At 801, the financial institution 898 selects a single one-size-fits-all financial institution application 899 that will be provided to the entire customer base allowing the user to manage their funds on deposit.

At 802, the financial institution application 899 connects directly to a core application 897 associated with the financial institution 898 through an API.

At 803, the user downloads the financial institution application 899 from the app store compatible with their personal computing device.

At 804, the user verifies their identity through the existing Know Your Customer (KYC) process used by the financial institution 898. This could include inputting account number, social security number, birth date, or other forms of personal information.

At 805, the financial institution 898 or its core application 897 has identified the correct account and allows the financial institution application 899 to have direct, real-time access to user financial data to manage funds on deposit. The financial Institution 898 or its core application 897 gives the user the ability to input commands into the financial institution application 899 which are then sent directly to the core application to be executed.

In contrast with existing systems (e.g., FIGS. 7-8), the disclosed architecture, including the access controller working in concert with the secure application, substantially increases online security, protects the user's data (e.g. financial data), and prevents network-based fraud. Without the access controller and the secure application, in order for the user to give an end-user application (e.g., a FinTech application) access to the user's financial data, the user must provide each individual FinTech end-user application with the user's login credentials. Once the user has given out login credentials to one or more third parties, those third parties have access to the user's account and could potentially compromise the account. In fact, scammers have successfully tricked users in the past into giving the scammers the user's login credentials, enabling the scammers to steal the user's funds. Additionally, if an unauthorized user gains access to the database of any of the third parties that are storing the user's login credentials, the user's login credentials could be stolen and the user's account could be further compromised. Furthermore, when the user uses an end-user application provided directly from their financial institution to manage financial data, the user's account may be compromised and fraudulent commands may be executed if the application were to be compromised.

As discussed above, one or more embodiments utilize a connection application to connect the secure application with the access controller. This connection is used to authorize end-user applications to access a user's sensitive data stored by an institution. With this software architecture, the user does not have to give out login credentials to third parties. Because end-user applications receive user data from the access controller and because the access controller uses the secure application for user authentication and authorization, a superior security protocol is being utilized which will greatly increase security. Furthermore, if an end-user application was compromised, all commands initiated from that application are sent to the access controller and must be confirmed within the secure application. Because the user would not authorize the fraudulent commands, the disclosed embodiments provide a more secure landscape than that which currently exists.

The disclosed access controller further provides the user with a more efficient tool for granting, expanding, limiting, or revoking an end-user application's (e.g., a FinTech app's) access to the user's sensitive data (e.g., financial data) without affecting the access rights of other end-user applications. Existing systems lack the disclosed access controller and have different architectures where, if the user wishes to revoke an end-user application's access to the user's data, the user must change the login credentials associated with the user's account (e.g., the user's account associated at a financial institution). However, this change would need to be propagated to all other FinTech end-user applications as they would still be configured with the now-incorrect credentials.

In one or more embodiments, the secure application and the access controller enable the user to grant, expand, limit or revoke individual access by each end-user application to the user's sensitive data. The disclosed embodiments thus provide a more efficient and secure tool for a user to dynamically control access and permission levels to their data as the user's needs change over time.

In one or more embodiments, the access controller allows interoperability for user accounts from any institution to communicate with multiple end-user applications. For example, any financial institution or credit union could communicate with any FinTech app, whether developed by the financial institution or by a third-party. Compared to existing architectures, the disclosed architecture thus increases the system's ability to integrate with third-party applications without compromising network security (and the security of the user's sensitive data).

For example, in existing systems, in order for a financial institution to feel comfortable allowing a FinTech application to access a customer's data stored at the financial institution, the financial institution requires the FinTech application to first go through a lengthy and costly due diligence and review process to make sure the FinTech application's security is sufficient. In order for a financial institution to be willing to invest the time and capital to go through the extensive review process with a potential new FinTech application, they need significant evidence that the FinTech application will be utilized by a wide enough customer segment so that the potential future benefits of integrating with the FinTech application outweigh the costs of going through the review process. Therefore, without the disclosed system, many potentially useful FinTech applications are not given an opportunity to connect to user accounts because the FinTech application is perceived by an agent of financial institution to not appeal to a large enough customer segment of the financial institution's customer (or member) base. Additionally, outside of the largest financial institutions, compliance, integration, and security costs prohibit most financial institutions from offering more than a single mobile application solution.

However, in one or more embodiments, FinTech applications are required to connect via the access controller. Because the access controller uses the secure application for authentication of the user's identity and to authorize commands, and because the financial institution has gone through an extensive review process with the secure application and the access controller, the financial institution has confidence that fraud, security, privacy, and compliance risks have been mitigated for any FinTech Applications using the secure application and the access controller. Therefore, developers who add FinTech Applications to the marketplace and integrate into the access controller would not have to each go through an extensive due diligence process with the financial institution. Because the financial institution no longer has to conduct a lengthy and expensive due diligence process with each individual FinTech or traditional financial institution application, the financial institution is now able to allow a nearly unlimited number of FinTech applications to come to market without the associated cost and risk, resulting in interoperability with a nearly unlimited number of FinTech applications.

In one or more embodiments, the access controller in concert with the secure application allow the user to be able to use custom niche solutions provided directly from their financial institution that directly help them or solve a personal or financial problem. Without the access controller, most financial institutions only offer one banking application that the user is able to use to manage their funds on deposit or other accounts. The application offered by financial institutions is a "one-size-fits-all" app that has to appeal to a wide customer base. As most banks have a diverse customer base, it is difficult to find a single app solution that works well for all customers. The user might need help with budgeting, investing, saving, paying off debt, managing a business, education, or many other types of financial management solutions, but in most cases, they are not able to get those from their financial institution. A third party provider app can be downloaded by the user to try and solve some of these problems, but the user will lose the security, compliance and trust that comes from working directly with their financial institution and incur liability of fraud. Without the access controller, the user must share login credentials to allow the third party application access to the user's data, which is a significant security risk. Additionally, without the access controller, the third party provider app is reliant on connections through aggregators (e.g., aggregator 799) which, unfortunately, are not reliable and if a connection goes down, the app loses all functionality.

Figure 9:
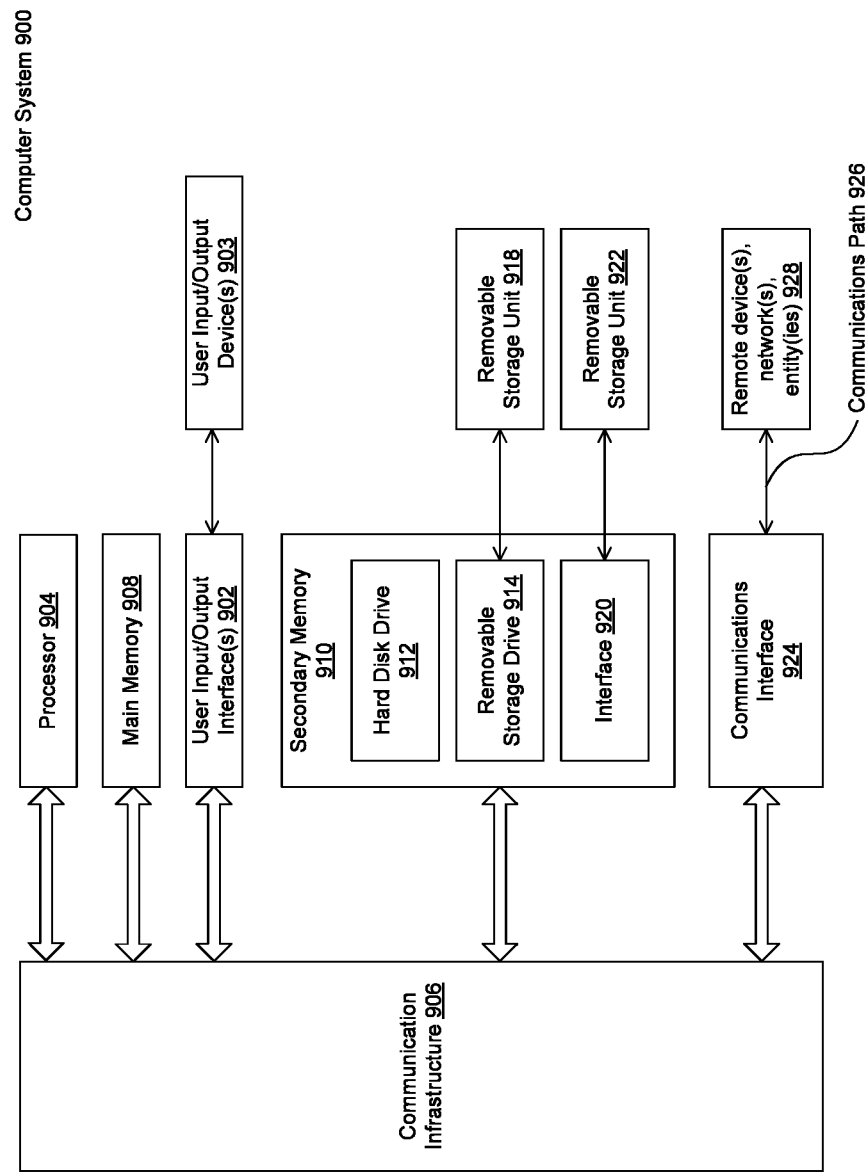
FIG. 9 is an example computer system useful for implementing various embodiments.

Various embodiments can be implemented, for example, using one or more computer systems, such as computer system 900 shown in FIG. 9. Computer system 900 can be used, for example, to implement the processes shown in FIGS. 2-6 or the components shown in FIG. 1.

Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918.

Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method for performing secure transactions, comprising:
providing an access controller between a core application and a third-party application, wherein the access controller prevents the third-party application from unauthorized access to the core application, wherein the access controller is independent from the core application;
receiving, by the access controller, a command from the third-party application to access the core application;
receiving, by the access controller, an identifier associated with the command and identifying a secure application, wherein the identifier is one of a two-dimensional bar code, numerical value, or a string, generated by the secure application and transmitted by the third-party application, wherein the third-party application and the secure application execute on a mobile device of a user;

transmitting, by the access controller, an authorization request to the secure application storing credentials of the user, wherein the access controller transmits the authorization request to the secure application based on the identifier;

providing, by the access controller, the third-party application with access to the core application in response to the access controller receiving a notification from the secure application that the command is authorized; and preventing, by the access controller, the third-party application from accessing the core application in response to the access controller receiving the notification from the secure application that the command is unauthorized.

2. The method of claim 1, wherein the providing the third-party application with access comprises transmitting, by the access controller, the command to the core application.

3. The method of claim 2, wherein the core application is associated with an institution, and wherein the core application executes the command.

4. The method of claim 3, wherein the command comprises locking a user account.

5. The method of claim 3, further comprising:
receiving, by the access controller, user data from the core application based on the command; and
transmitting, by the access controller, the user data to the third-party application,
wherein the command comprises a request to download the user data from the core application to the third-party application.

6. The method of claim 5, wherein the user data comprises health data of the user.

7. The method of claim 3, further comprising:
validating the credentials on a ledger with the institution, wherein the institution issued the credentials.

8. The method of claim 1, wherein the secure application displays an alert to the user in response to receiving the authorization request.

9. A system for performing secure transactions, comprising:
a computer processor; and
a memory storing an access controller that, when executed by the computer processor, performs a plurality of operations that prevent unauthorized access to a core application, wherein the access controller is independent from the core application, the plurality of operations comprising:
receiving a command from a third-party application to access the core application;
receiving an identifier associated with the command and identifying a secure application, wherein the identifier is one of a two-dimensional bar code, numerical value, or a string, generated by the secure application and transmitted by the third-party application, wherein the third-party application and the secure application execute on a mobile device of a user;
transmitting an authorization request to the secure application storing credentials of the user, wherein the access controller transmits the authorization request to the secure application based on the identifier;
providing the third-party application with access to the core application in response to the access controller receiving a notification from the secure application that the command is authorized; and
preventing the third-party application from accessing the core application in response to the access controller receiving the notification from the secure application that the command is unauthorized.

10. The system of claim 9, wherein the providing the third-party application with access comprises transmitting, by the access controller, the command to the core application, and wherein the core application executes the command.

11. The system of claim 10, wherein the core application is associated with an institution, and wherein the command comprises a request to download user data from the core application to the third-party application.

12. The system of claim 11, the plurality of operations further comprising:
receiving the user data from the core application based on the command; and
transmitting the user data to the third-party application.

13. The system of claim 11, the plurality of operations further comprising:
validating the credentials on a ledger with the institution, wherein the institution issued the credentials.

14. A non-transitory computer readable (CRM) storing instructions for performing secure transactions using an access controller, the instructions, when executed by a computer processor, cause the access controller to perform a plurality of operations that prevent unauthorized access to a core application, the plurality of operations comprising:
receiving a command from a third-party application to access the core application, wherein the access controller is independent from the core application;
receiving an identifier associated with the command and identifying a secure application, wherein the identifier is one of a two-dimensional bar code, numerical value, or a string, generated by the secure application and transmitted by the third-party application, wherein the third-party application and the secure application execute on a mobile device of a user;
transmitting an authorization request to the secure application storing credentials of the user, wherein the access controller transmits the authorization request to the secure application based on the identifier;
providing the third-party application with access to the core application in response to the access controller receiving a notification from the secure application that the command is authorized; and
preventing the third-party application from accessing the core application in response to the access controller receiving the notification from the secure application that the command is unauthorized.

15. The non-transitory CRM of claim 14, the plurality of operations further comprising:
wherein the command comprises a request to download user data from the core application to the third-party application;
receiving the user data from the core application based on the command; and
transmitting the user data from the access controller to the third-party application,
wherein the core application is associated with an institution.

16. The non-transitory CRM of claim 15, the plurality of operations further comprising:
validating the credentials on a ledger of the institution, wherein the institution issued the credentials.

* * * * *